US005722705A

United States Patent [19]

Deguchi

[11] Patent Number: 5,722,705
[45] Date of Patent: Mar. 3, 1998

[54] LOCK STRUCTURE FOR COVER OF ELECTRONIC APPLIANCE

[75] Inventor: Manabu Deguchi, Tokyo, Japan

[73] Assignee: NEC Corporation, Tokyo, Japan

[21] Appl. No.: 661,917

[22] Filed: Jun. 12, 1996

[30] Foreign Application Priority Data

Jun. 24, 1995 [JP] Japan ................... 7-180871

[51] Int. Cl.$^6$ ................................. E05C 19/06
[52] U.S. Cl. ................. 292/87; 292/163; 292/DIG. 37; 429/97
[58] Field of Search ............ 292/64, 164, 163, 292/341.15, DIG. 37, 87; 429/97, 98

[56] References Cited

U.S. PATENT DOCUMENTS

| 686,271 | 11/1901 | Dillenbeck et al. ............ 292/87 |
| 1,092,651 | 4/1914 | Jordan, Jr. ................ 292/87 X |
| 1,142,994 | 6/1915 | Telford .............. 292/DIG. 37 X |
| 1,868,949 | 7/1932 | Pat ....................... 292/87 |
| 2,682,423 | 6/1954 | Ashworth ................. 292/87 |
| 3,881,332 | 5/1975 | Ballew, Sr. et al. ........... 292/164 X |
| 3,999,110 | 12/1976 | Ramstrom et al. ........ 292/341.15 X |
| 5,307,511 | 4/1994 | Takahashi . |
| 5,337,215 | 8/1994 | Sunderland et al. ............ 429/97 X |

FOREIGN PATENT DOCUMENTS

| 0 716 461 A1 | 6/1996 | European Pat. Off. . |
| 62-58934 | 4/1987 | Japan . |
| 62-120260 | 7/1987 | Japan . |
| 64-15449 | 1/1989 | Japan . |
| WO 90/10955 | 9/1990 | WIPO . |

Primary Examiner—Rodney M. Lindsey
Attorney, Agent, or Firm—Young & Thompson

[57] ABSTRACT

A lock structure for locking a battery cover 3, the lock fitted to a battery storage portion 2 in a housing body 1 of an electronic applicance. The lock structure includes a manipulation member 9, which is elastically deformed in a depth direction thereof by a slot formed in a portion of the housing body 1. The manipulation member 9 supports a lock member 6 with a spring, a top portion of the lock member 6 protruding into the battery storage portion. The battery cover 3 includes a rib with a notch portion 5 having a slanted edge. The battery cover 3 is locked with an engagement of the lock member with the notch portion. Further, when the manipulation member 9 is elastically deformed by being pushed, the lock member 6 moves integrally with the member 9, and the lock member is released from the engagement with the notch portion 5 so that the cover 3 is released from the locked state.

5 Claims, 5 Drawing Sheets

LOCK STRUCTURE FOR COVER OF ELECTRONIC APPLIANCE

BACKGROUND OF THE INVENTION

1. Field of the Invention

The present invention generally relates to a structure of a housing of an electronic appliance wherein a cover is attached to an electronic appliance body detachably. More specifically, the present invention is directed to a lock structure used to lock the cover and the like of a battery chamber to the body.

2. Description of the Related Art

In an electronic appliance such as a personal radio paging receiver and a radio telephone, which uses a battery as a power source, a battery chamber is provided in a portion of a housing of the electronic appliance. Replacement of the battery is done by detaching the cover covering the battery chamber. In this case, a lock structure is provided in order that the cover attached to the housing of the electronic appliance is not dropped therefrom carelessly. For instance, Japanese Utility Model Laid-open No. 15449/1989, No. 120260/1987, and 58934/1987 disclose such lock structures.

FIG. 1 is an example of a conventional lock structure. In this lock structure, an opening is formed on the back surface of a body 21 of a personal paging receiver, and a battery is stored inside the opening serving as a battery storage chamber 22. A battery cover 23 covering the battery storage chamber 22 is provided separately from the foregoing body 21. The cover 23 is equipped with guide pieces 24, each of these guide pieces 24 extending along corresponding sides of both side edges of its inner surface. These guide pieces 24 are guided along step portions 21a on both side edges of the battery storage chamber 22. Thus, the battery cover 23 is attached detachably to the battery storage chamber 22 by sliding the guide pieces 24 along the step portions 21a. Then, in order to realize the lock structure for the battery cover 23, a lock groove 25 is formed in one side edge of the battery storage chamber 22. A lock member 26 is installed in the lock groove 25, which is movable in a perpendicular direction to this side edge by hand.

When an operation to protrude the lock member 26 into the battery storage chamber 22 is performed, the top portion of the member 26 is tightly inserted in a notch 27, which is formed in a portion of the guide piece 24 of the cover 23, whereby the cover 23 is locked such that sliding of the cover 23 along the battery storage chamber 22 will be inhibited and the drop of the cover 23 from the body 21 will be prevented. Furthermore, when detaching the battery cover 23 from the body 21, the lock member 26 is moved in a reverse direction by hand and then the top portion of the member 26 is drawn out from the notch 27. Thus, the cover 23 is made slidable along the battery storage chamber 23 so that the cover 23 can be detached from the body 21.

With such conventional lock structure, in order to lock the battery cover 23 or to release the cover 23 from the locked state, the operation to slide the lock member 26 is necessary. However, since the lock member 26 is provided at the concave position lower than the surface of the body 21, there is a drawback that an operation performance is bad. That is, with the lock member 26 protruded from the surface of the body 21, the lock member 26 may be moved undesirably by contacting with the hand and the like during the ordinary operation of the electronic appliance, the electronic appliance becoming in a lock release state. The battery cover 23 drops from the body 21, so that the battery also might drop from the battery storage chamber 22, thereby hindering normal usage of the electronic appliance. For this reason, the lock member 26 is at the concave state from the surface of the body 21. As a result, an operator has to put his finger into the lock groove 25 in order to slide the lock member 26. In the narrow groove 25, a sufficient operation force to slide the member 26 cannot be exerted with the finger so that it is difficult to slide the member 26 easily.

Further, accompanying the production of small and thin electronic appliances, demand for a small lock member has increased. On the other hand, a predetermined operation force is required for operating the lock member and the lock member is operated only with the finger. Therefore, it is difficult to slide the lock member because of miniaturization of the member, resulting in the deterioration of operation performance. Therefore, when the security of the operation performance to some degree is intended, there is a limitation to the miniaturization of the lock member. This hinders obstacles to the miniaturization of electronic appliances.

SUMMARY OF THE INVENTION

The object of the present invention is to improve an operation performance of attachment/detachment to/from a cover of an electronic appliance, and to provide a lock structure of the cover of the electronic appliance, which enables the miniaturization of the lock structure of the cover.

A lock structure of the present invention serves to fix the cover to an opening of a housing of the electronic appliance after fitting the cover thereon. The lock structure comprises sliding means for sliding a cover along a housing; regulating means for regulating the movement of the cover in a perpendicular direction to a sliding direction of the cover; and lock means for regulating the movement of the cover in the sliding direction thereof, wherein the lock means includes a lock member engaging with the cover and a manipulation member holding the lock member to the housing; and an engaging portion of the lock member engaging with the cover is held movably in the perpendicular direction to the sliding direction of the cover with elasticity; and the manipulation member is held to the housing with elasticity such that the lock member held by the manipulation member is movable by being pushed in an inner direction of the housing.

The engaging portion of the lock member with the cover is concealed by contacting with the cover during a sliding operation of the cover to be fitted. The engaging portion of the lock member is tightly inserted in the cover at a position where the cover is to be fixed, and is moved by pushing the manipulation member to release the engaging portion from its inserted state in the cover.

The engaging portion of the lock member with the cover has a slanted top surface, the height of which increase along a slidable inserting direction of the cover. The lock member is slidably held to the holding member provided in the manipulation member, and is supported by the manipulation member via an elastically deformable member. The elastically deformable member for supporting the lock member should be preferably a coil spring.

In addition, alternatively, the engaging portion of the lock member with the cover is formed of a rotative member, which has the top portion, acting as a fulcrum, disposed in an inserting direction of the cover and is normally held obliquely in order that its height is increased toward the opposite top portion. The rotative member provided in the engaging portion of the lock member is supported by a member which is elastically deformable. This member which is elastically deformable may be a coil spring, a leaf spring, or an elastically deformable portion of the rotative member.

Furthermore, the side surface of the lock member of the cover facing the engaging portion may be a slanted surface in order that the top portion of the engaging portion of the lock member is thrust gradually during the insertion of the cover into the housing.

The engaging portion of the cover with the lock member may be a lock groove capable of tightly holding the lock member, both side surfaces of which may be slanted toward an inserted top portion of the cover, as well as toward an inside of the housing.

The manipulation member includes an elastically deformable member, which is an elastically deformable portion of the housing. The elastically deformable member may be defined from other portions of the housing by a slit. The engaging portion of the lock member should be preferably released from the engagement with the lock groove at the maximum deforming position of the elastically deformable member of the manipulation member.

Sliding means for sliding the cover on the housing consists of a rib formed in both sides of the cover and both side edges of an opening of the housing. The lock groove may be a notch portion provided in the rib.

Regulating means for regulating the movement of the cover in a direction perpendicular to the sliding direction thereof may be an engaging flange provided on the top surface of the cover in an inserting direction and an engaging pawl provided on an inner surface of the outer top portion in an opposite direction to the inserting direction, and an engaging groove and engaging holes which are provided at a position facing an opening of the housing and engage with the flange and pawl, respectively, when the cover is attached to the opening. In regulating means, accompanied with the movement of the engaging portion of the lock member by pushing the manipulation member, a force in the sliding direction is exerted on a slanted side surface of the lock groove, the cover is moved back by this force, and the engagement of the flange with the groove and the engagement of the pawl with the hole are preferably released at the maximum movement position.

Batteries may be stored within the opening of the housing.

When fitting the cover to the opening by sliding the cover, the lock member kept in a moved back into the inside of the housing by the cover is tightly inserted either in the groove or in the notch portion of the cover by an energizing force of the elastically deformable member. The cover is put into the locked state. Further, when the manipulation member is subjected to an elasticity deformation by pushing, the lock member is allowed to move integrally with the manipulation member so that the lock member is released from the lock groove or the notch portion. The cover is put into the unlocked state.

Further, if the lock groove or the notching portion comprises a slanted edge, the lock member contacts with the slanted edge by an elastic deformation force applied to the manipulation member so that the lock member acts a sliding force on the cover. Thus, the engagement of the engaging flange and pawl of the cover with the engaging groove and hole of the opening are released so that the cover is detached from the opening.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 4a is a sectional view taken along the line 4A—4A of FIG. 2, and FIG. 4b is a sectional view taken along the line 4B—4B of FIG. 4a;

FIG. 5a is a sectional view taken along the line 4A—4A of FIG. 2, and FIG. 5b is a sectional view taken along the line 5B—5B of FIG. 5a;

FIG. 6a shows a state that cover is being inserted, and FIG. 6b shows a state that inserting of cover is performed; FIG. 7a shows a state that cover is being inserted, and FIG. 7b shows a state that inserting of cover is performed.

DETAILED DESCRIPTION OF THE PREFERRED EMBODIMENTS

Figure 1:
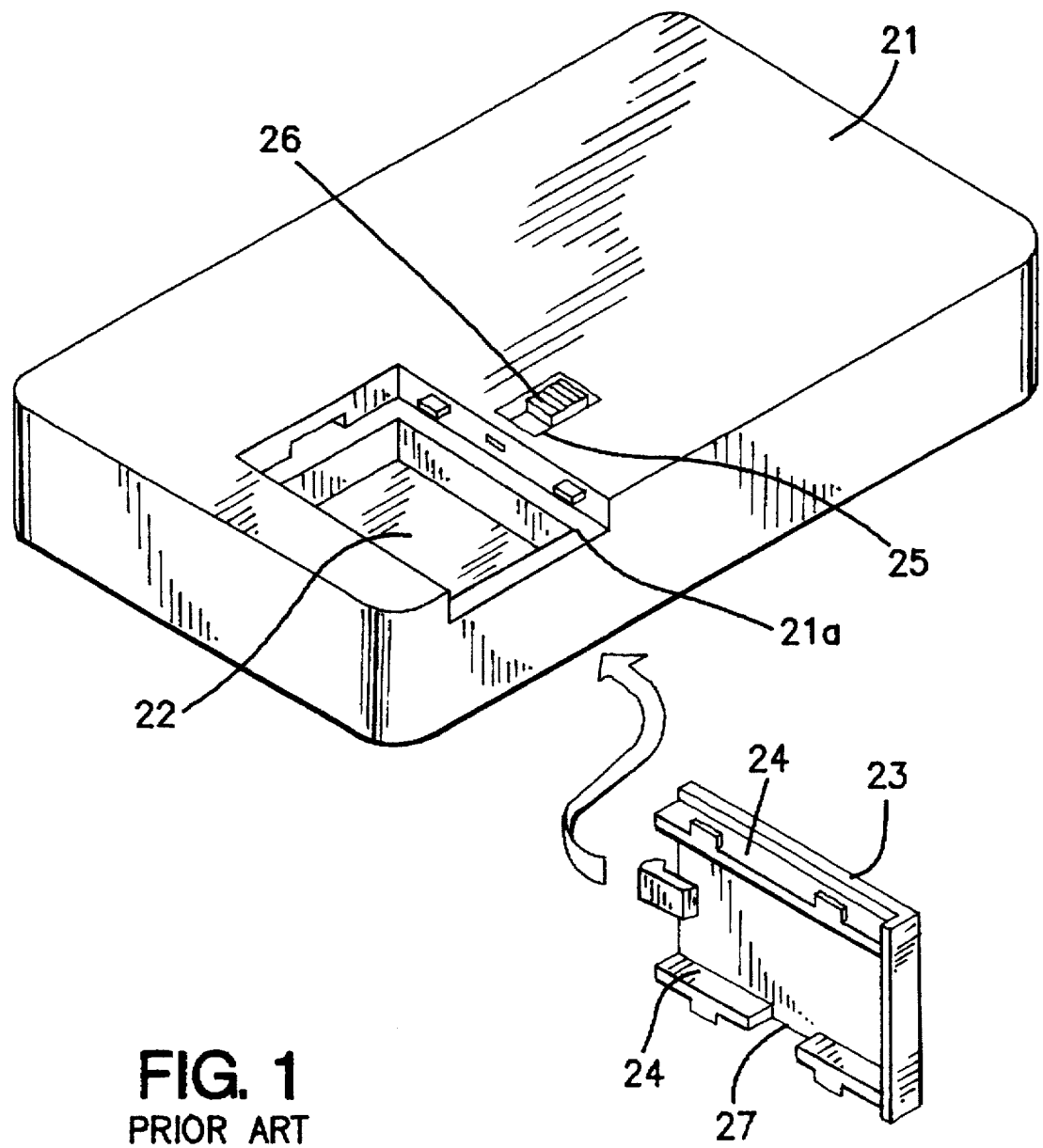
FIG. 1 is a partly exploded perspective view of a housing for representing an example of a conventional lock structure.
Figure 2:
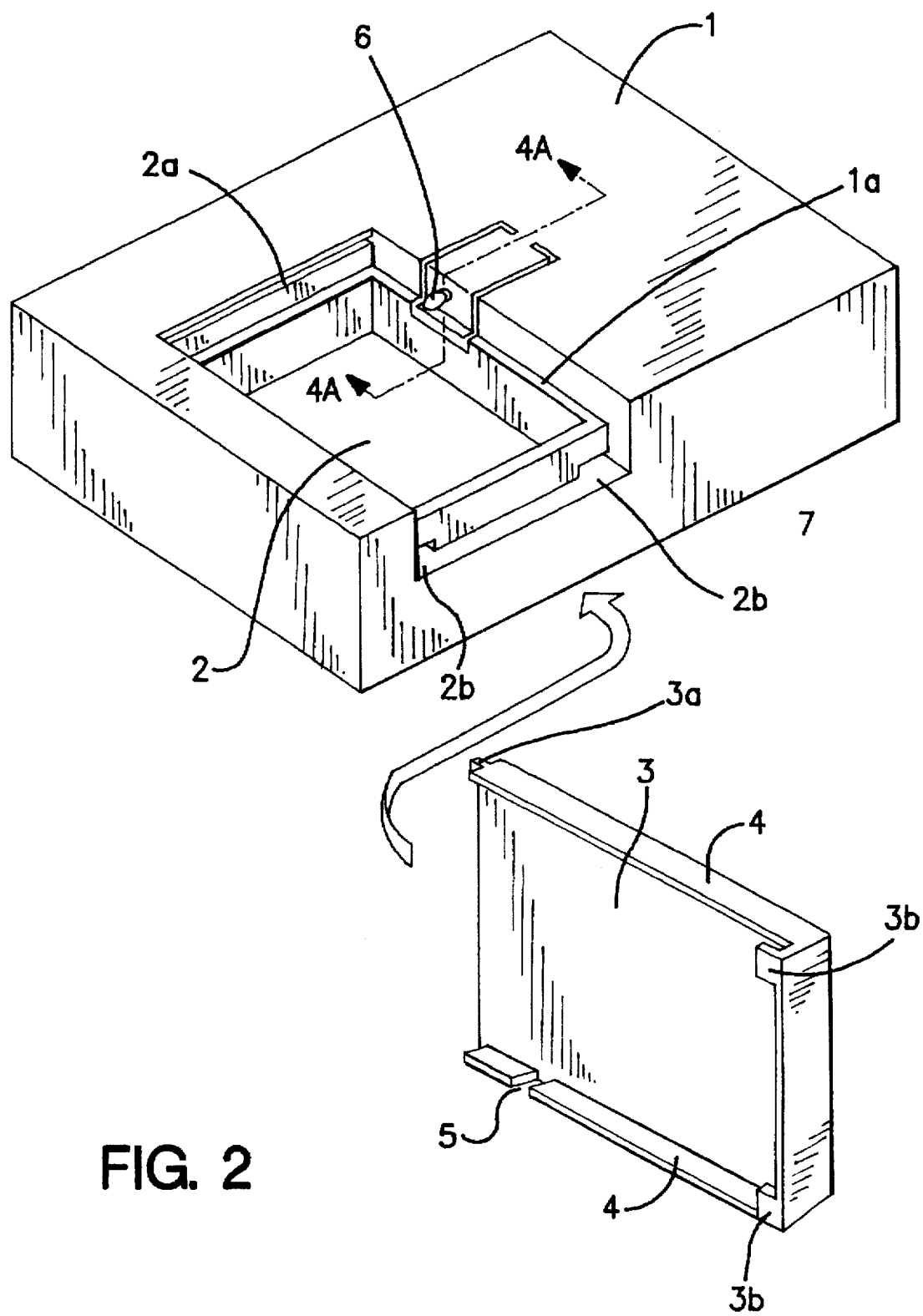
FIG. 2 is a partly exploded perspective view of a housing for showing an embodiment of a lock structure of the present invention.

Next, an embodiment of the present invention will be described with reference to the drawings. FIG. 2 is a perspective view viewed from the rear surface side of an embodiment of the present invention when the present invention is applied to a personal paging receiver. An opening is formed in the rear surface of a housing body 1 of this personal paging receiver. The opening is constituted so as to serve as a battery storage portion 2 for storing batteries therein. A battery cover 3 slides along the housing body 1 to be fitted thereto, so as to cover the battery housing portion 2. Specifically, the battery storage portion 2 includes a step portion 1a of the housing body 1 arranged along its periphery. An engaging groove 2a, which extends in the width direction of the battery storage portion 2, is formed on the end face of the top portion of the battery storage portion 2 where the battery cover 3 is inserted. A pair of engaging holes 2b are perforated in the other end face of the opposite opening side. On the other hand, a rib 4 protruding from the rear surface of the battery cover 3 is formed along its both edge portions which are parallel to the inserting direction. An engaging flange 3a is formed on the top end face in the inserting direction, which is integrated with the battery cover 3 and protrudes therefrom. A pair of engaging pawls 3b are formed at both sides of the top portion opposite to that where the engaging flange 3a is formed. The pawls 3b protrude into the inside and are integrated with the cover 3.

A parallelogram-shaped notch portion 5 is provided in one rib 4. The notch 5 is capable of engaging with a later described lock member 6.

The foregoing battery cover 3 can be fitted to the battery storage portion 2 while the ribs 4 at both sides of the cover 3 are being slid along the step portions 1a at both sides of the chamber 2. The engaging pawl 3a is inserted in the engaging groove 2a of the battery storage portion 2 at the final sliding position after completion of fitting. At the same time, a pair of engaging pawls 3b are inserted in the corresponding engaging holes 2b. Thus, displacement of the battery cover 3 in an upward direction of the battery storage portion 2 is restrained. As long as the battery cover 3 is not slid in the opposite direction to the inserting direction, the cover cannot be removed from the portion 2.

The foregoing lock member 6 is supported by a manipulation member 7 provided in a portion of one side periphery of the foregoing battery storage portion 2. The manipulation member 7 is formed against the outer wall portion of the housing body 1 by providing a slit 8 which is approximately a square, one side of which is closed. A region portion 9 surrounded by the slit 8 is made tongue-shaped. When the tongue-shaped region portion 9 is pushed from outer surface side of the housing body 1, the region portion 9 deforms elastically in an inner direction of the housing body 1.

Figure 3:
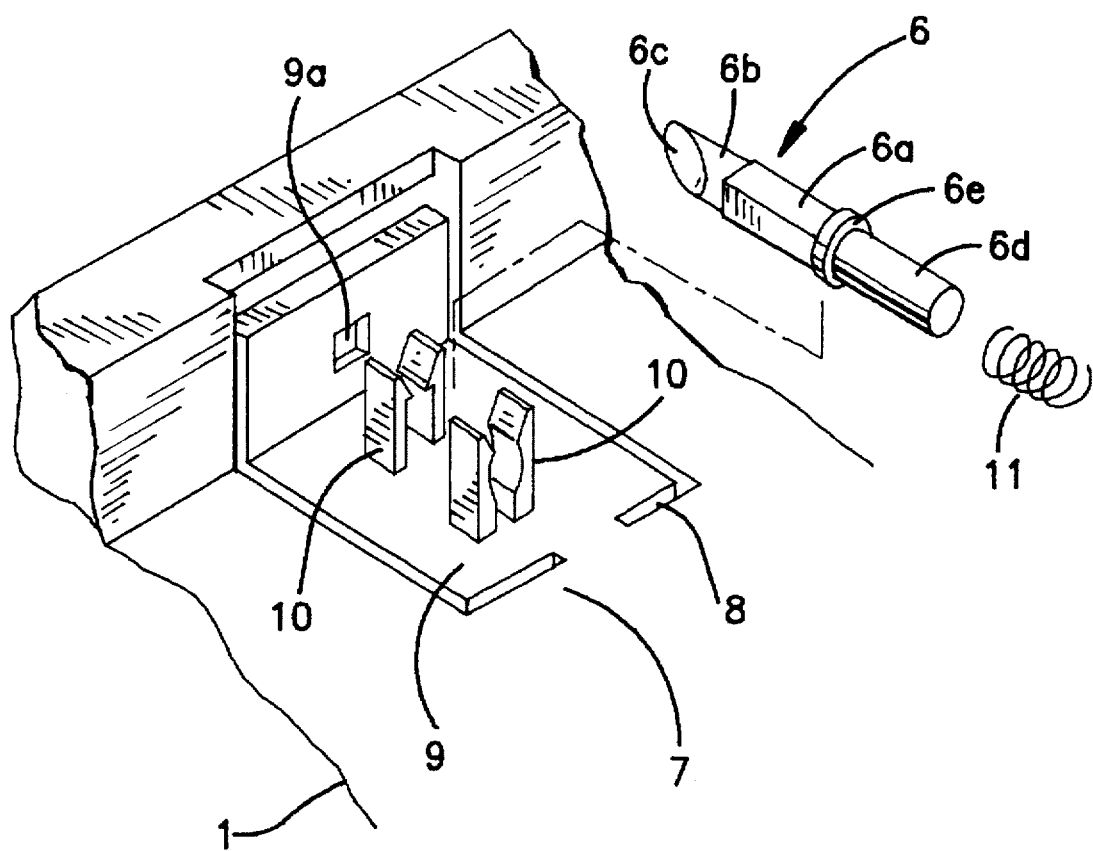
FIG. 3 is a perspective view for showing an internal constitution of a manipulation member.

FIG. 3 is a drawing showing an internal structure of the foregoing manipulation member 7. FIG. 3 is obtained by turning upside down with respect to FIG. 2.

In FIG. 3, a pair of lock member guides 10 standing up are provided on an inner surface of the foregoing tongue-shaped region portion 9, the lock member guides 10 being forked into two branches. The foregoing rod-shaped lock member 6 is supported movably in its axis direction within the lock member guide 10. The lock member 6 consists of a top portion 6b, an intermediate portion 6a, a flange portion 6e, and a base portion 6d. The intermediate portion 6a has a rectangular section, and is protruded toward the inside of the foregoing battery storage portion 2 through a rectangular hole 9a, which is formed on the top surface of the foregoing tongue-shaped region portion 9, together with the top portion 6b having a circle section. An end surface 6c of the top portion 6b is made to be an oblique sloping surface so that the height increases along the inserting direction of the foregoing battery cover 3.

Further, the base portion of the lock member 6 having a circle section is supported in the foregoing lock member guide 10. The flange 6e is formed at an end portion of the base portion 6d at an intermediate portion side. A coil spring 11 is fitted to the base portion 6d between the flange 6e and the lock member guide 10. In this situation, the spring 11 is energized. The lock member 6 is pressed by an elasticity force of the spring 11 in a direction where the top portion thereof protrudes in the battery storage portion 2.

In sequence, in a normal situation, the top portion 6b of the lock member 6 is protruded from the hole 9a of the foregoing tongue-shaped region portion 9 toward the inside of the battery storage portion 2. It is noted that the diameter dimension of the top portion 6b of this lock member 6 is approximately the same as the width dimension of the notch portion 5 provided in one rib 4 of the foregoing battery cover 3.

Next, an operation of attaching/detaching the battery cover 3 will be described. At the attachment of the battery cover 3, the rib 4 of the battery cover 3 is in contact with the step portion 1a of the battery storage portion 2, and then the battery cover 3 is inserted from the outside of the battery storage portion 2 by sliding the cover 3. Since the top portion 6b of the lock member 6 is in a situation that it is protruded toward the inside of the battery storage portion 2 by the elastic force of the spring 11, when the battery cover 3 is slid by a predetermined distance, the rib 4 is tightly contacted with the top oblique sloping surface 6c. Subsequently, the top portion of the lock member 6 is thrust into the inside of the tongue-shaped region portion 9 by a cam action interacted between the rib 4 and the top oblique sloping surface 6c. In sequence, it is possible to slide further the battery cover 3.

Figure 4A:
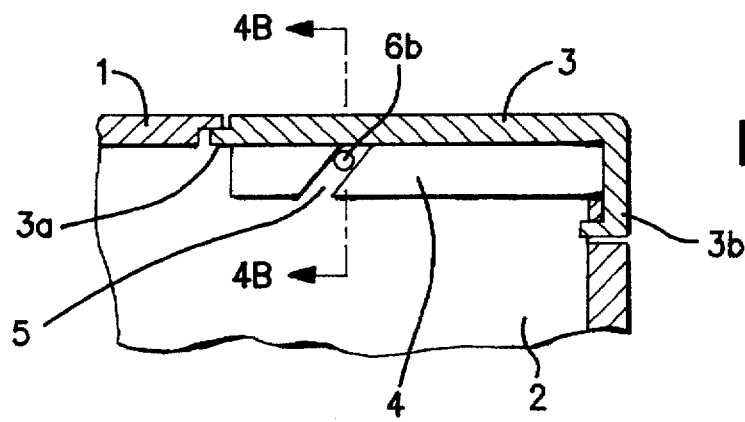
FIGS. 4a and 4b are partly sectional views for showing a situation where a battery cover is mounted on a body of the housing, especially.
Figure 4B:
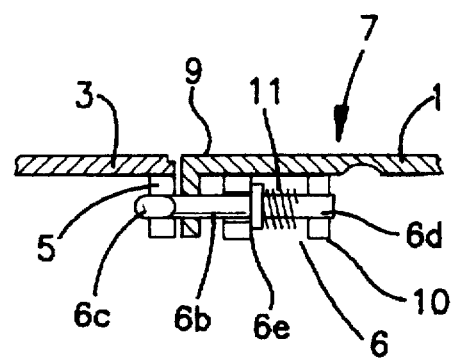

As shown in FIG. 4a which is a sectional view taken along the line 4A—4A of FIG. 2 and FIG. 4b which is a sectional view taken along the line 4B—4B of FIG. 4a, when the battery cover 3 is slid to the final position, the engaging pawl 3a at the top surface of the cover 3 is inserted in the engaging groove 2a, and the engaging pawl 3b is inserted in the engaging groove 2b. Therefore, it is impossible to remove the battery cover 3 above the housing body 1 shown in FIG. 2.

Further, at the same time, the notch portion 5 moves into the position of the lock member 6, so that the top portion 6b of the lock member 6 is again protruded by the energized force of the spring 11. The top portion 6b enters the notch portion 5. Therefore, in this situation, even when the sliding of the battery cover 3 toward the reverse direction (toward the right direction of FIG. 4a) is tried, the sliding of the cover 3 is inhibited by the engagement of the lock member 6 with the notch 6. It is prevented that the cover 3 is carelessly detached.

Figure 5A:
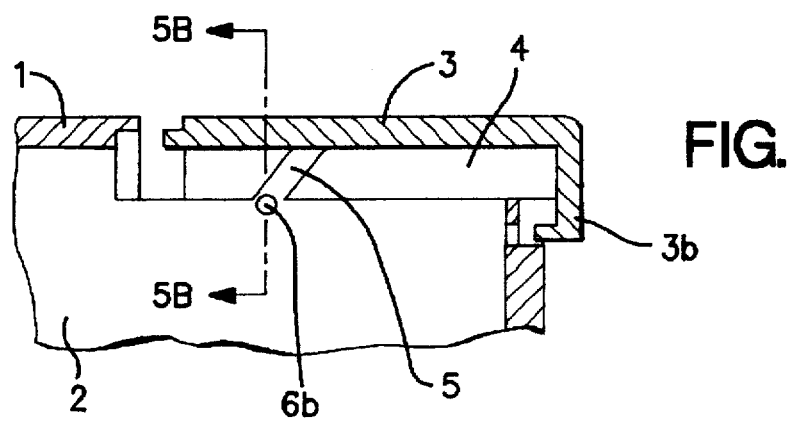
FIGS. 5a and 5b are partly sectional views for showing a situation where the battery cover is being removed from the body of the housing.
Figure 5B:
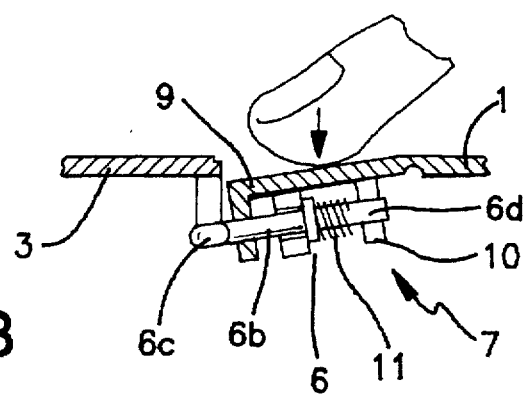

On the other hand, as shown in FIG. 5a, which is a sectional view taken along the line 4A—4A of FIG. 2 and FIG. 5b which is a sectional view taken along the line 5B—5B of FIG. 5a, when the battery cover 3 is detached, the outer-surface of the tongue-shaped region portion 9 is pushed by the finger or the like. The region portion 9 moves downward. Then, since the top portion of the lock member 6 also moves downward in accordance with the movement of the region portion 9, the top portion 6b is tightly in contact with a slanted edge portion of the notch portion 5. By the cam action interacted between the top portion 6b and the edge portion of the notch portion 5, the horizontal direction component of the pushing load applied to the tongue-shaped region portion 9 is applied to the notch portion 5.

Therefore, as the top portion 6b of the lock member 6 is moved downward, the battery cover 3 is accordingly slid in the right direction as shown in FIGS. 5a and 5b. Then, the engaging flange 3a comes off from the engaging groove 2a, and the engaging pawl 3b comes off from the engaging hole 2b. At the same time, the top portion 6b of the lock member 6 comes off from the notch portion 5 so that all of the engagements in the battery cover 3 are released. Hence, the removal of the cover 3 from the battery storage portion 2 comes to be possible.

Therefore, with such constitution, when the battery cover 3 is to be locked, the sliding of the battery cover 3 along the battery storage portion 2 may be simply performed. When the cover 3 is released from being locked, the manipulation member 7 may be simply pushed. For this reason, even when the lock structure is miniaturized in accordance with the demand for miniaturization of the electronic appliance, the attachment and detachment of the battery cover 3 can be done with ease, and the manipulation for releasing the cover from the locked state can be also performed easily. Consequently, operation performance can be raised.

Next, an embodiment in which the lock member differs from that of the above-described embodiment will be explained with reference to FIGS. 6 and 7.

Manipulation members 39 and 49 are composed of a tongue-shaped region portion which is defined from a housing body 31 and 41 by a slit, similar to the foregoing embodiment.

In the embodiment of FIG. 6, a lock member 36 is formed in integration with the tongue-shaped region. The lock member 36 is supported elastically by a connection portion of the lock member 36 to the slender portion of the tongue-shaped region portion, which serves as a fulcrum, under the state that the lock member 36 protrudes outward. In the embodiment of FIG. 6, the lock member 36 is supported elastically utilizing the elasticity of the tongue-shaped region portion. When the lock member formed as a member independent from the tongue-shaped region portion is rotatively held by a manipulation member, and it is supported by an elastically deformable member, a similar operation can be obtained.

Figures 6A, 6B:
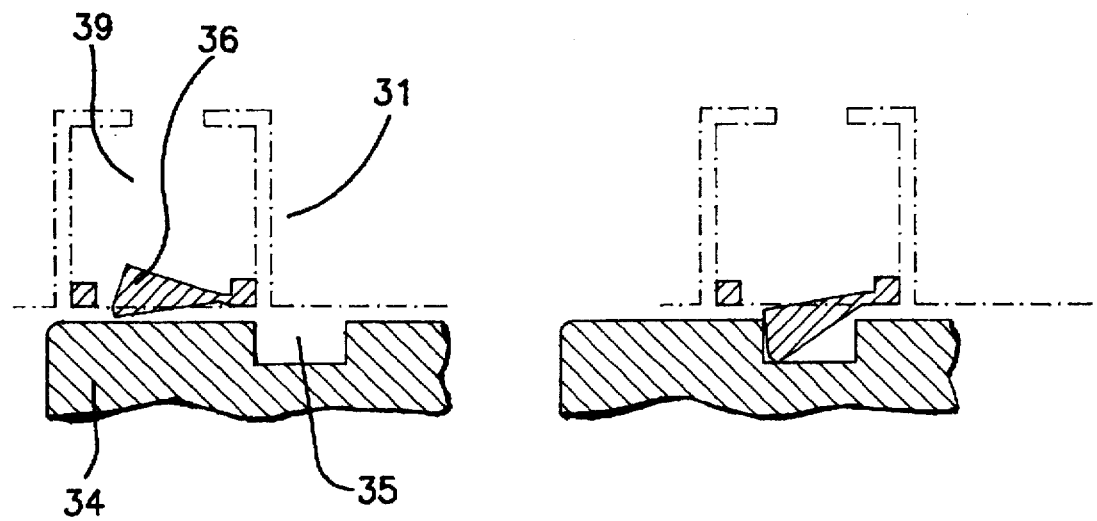
FIGS. 6a and 6b are partly sectional views for showing a lock means of another embodiment of a lock structure of the present invention.

FIG. 6a shows a state that the cover is being inserted, and FIG. 6b shows a state that inserting of the cover 36 is completed. When an inserting operation of the cover is performed, the lock member 36 is thrust inward by the cover 34. When the cover 34 reaches a predetermined fixing position where the cover is to be fixed, the lock member 36 is inserted in a lock groove 35 so that the return of the cover 36 is locked.

In the embodiment of FIG. 7, in forming a slanting surface in the top portion of the lock member 46, the slanted surface is formed on the side surface of the cover 44. The adoption of such constitution removes the limitation to the position in a rotation direction of the lock member 46, so that it is unnecessary for the lock member to have a rectangular section.

Figures 7A, 7B:
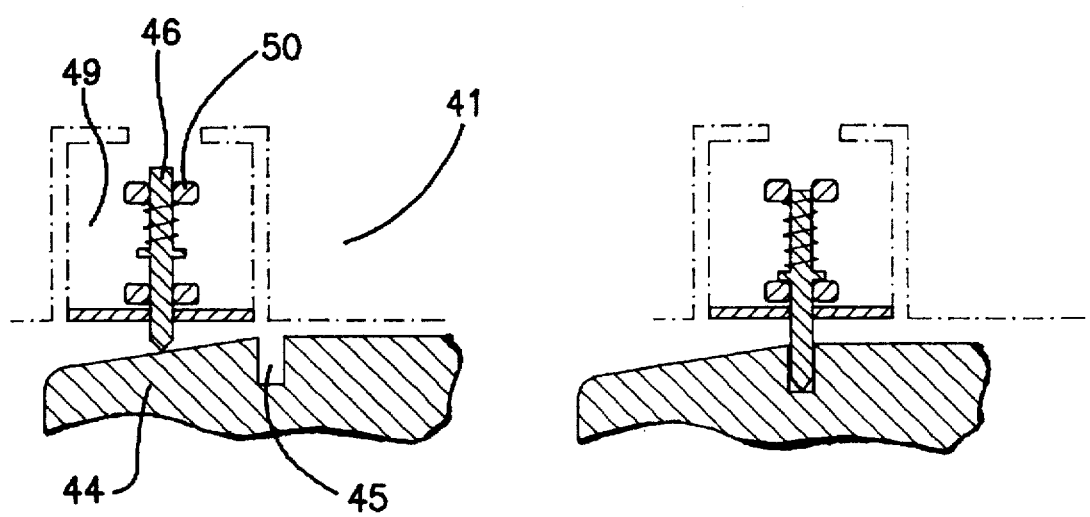
FIG. 7a and 7b are partly sectional views for showing a lock means of another embodiment of a lock structure of the present invention.

FIG. 7a shows a state that the cover is being inserted, and FIG. 6b shows a state that inserting of the cover is completed. When an inserting operation of the cover 44 is performed, the lock member 46 is thrust inward by the slanted surface of the cover 44. When the cover 44 reaches a predetermined fixing position where the cover is to be fixed, the lock member 46 is inserted in a lock groove 45 so that the return of the cover 46 is locked.

An operation to release the lock member from the engaging state with the lock groove by pushing the manipulation member is the same as that of the foregoing embodiment, and an explanation thereof is omitted.

The foregoing embodiments are examples in which the present invention has been applied to personal paging receivers. However, the present invention is not limited to these embodiments, but may be similarly applied to a lock structure of a battery cover for a portable telephone, and other electronic appliances. Furthermore, the present invention may be similarly applied to a cover other than a battery cover.

As described above, according to the present invention, the manipulation member which is capable of elastically deforming in the depth direction thereof with respect to the housing body, and the lock member which is supported by the manipulation member to prevent the detachment of the cover from the opening are provided. When the manipulation member is elastically deformed, the lock means is released from the engaging state with the cover. Thus, it is unnecessary to manipulate the lock member when the cover is attached, and the manipulation member may be simply pushed when the cover is detached. It can be prevented that the cover is dropped from the housing body carelessly, and the cover can be detached easily as occasion demands. In addition, the operation at this time is extremely simple, so that operation performance can be enhanced.

Furthermore, in the present invention, the manipulation member is constituted as a portion of the housing body, and at the time of detaching the cover, and the manipulation is elastically deformed by pushing it. Therefore, the lock means does not hinder to miniaturization of the electronic appliance, and operation performance of lock means is not damaged at all when lock means is miniaturized.

Furthermore, the notch portion which has the slanted edge is provided in the portion of the rib which is formed in the cover. The lock member is Engaged with the notch portion by the spring force so that the cover is locked. The manipulation member releases, along the slanted edge, the lock member from the notch portion when the manipulation member is elastically deformed. Therefore, by the elastic deformation force applied to the manipulation force, the lock member contacts tightly with the slanted edge of the notch portion so that the lock member applies the sliding force to the cover. The lock member is able to release the cover from the opening, thereby making the releasing operation of the cover easier.

It is to be understood, however, that although the characteristics and advantages of the present invention have been set forth in the foregoing description, the disclosure is illustrative only, and changes may be in the arrangement of the parts within the scope of the appended claims.

What is claimed is:

1. In combination with a housing for an electronic device, a cover of the housing and a locking structure for securing the cover of the housing which closes an opening in said housing, said locking structure comprising:

recessed portions of said housing adjacent said opening, for receiving edge portions of the cover and preventing lateral movement of the cover in a first direction a manipulating member secured to said housing adjacent one side of the opening, said manipulating member being movable interiorly of said housing and toward a bottom of the opening in a second direction perpendicular to said first direction a locking member resiliently mounted on said manipulating member and movable relative to said manipulating member along said first direction from an extended position in which said locking member projects into one of said recessed portions to a retracted position in which said locking member is withdrawn from said recessed portion whereby the locking structure further comprises a notch in said cover and when the housing is fitted with said cover having the notch aligned with the locking member, positions the locking member in the notch to prevent lateral movement of the cover in a third direction perpendicular to the first and second directions, and allows the locking member to be displaced free of the notch responsive to depression of the manipulating member in said second direction.

2. The locking structure according to claim 1, wherein said locking member is a pin slidably mounted on the manipulating member via a spring, the spring urging the pin toward said extended position, said pin having an angled tip such that, when the cover is fitted on the housing by sliding along the recessed portions, an edge of the cover coacts with the angled tip of the pin to displace the pin along said first direction to said retracted position, against the action of the spring, until the notch of the cover is aligned with the pin, whereupon the pin resumes said extended position.

3. The locking structure according to claim 1, wherein said manipulating member is formed integrally with said housing and comprises an outermost surface flush with said housing, said manipulating member being defined by cut-out portions of said housing surrounding three sides of said manipulating member.

4. The lock structure according to claim 1, wherein said locking member is a lug formed integrally with said manipulating member and secured thereto by a relatively narrower portion providing said resilient mounting, the lug normally occupying said extended position and being movable against the resilience of said narrower portion to said retracted position.

5. The lock structure according to claim 1, wherein the notch of said cover extends obliquely relative to said second direction, such that depression of the manipulating member in said second direction, when said cover is secured to said housing, causes said locking member to coact with said notch to displace said cover by a predetermined extent along said third direction.

\* \* \* \* \*